Oct. 22, 1957  F. L. KIRKHAM  2,810,567
CUTTER TOOL ASSEMBLY PROVIDING A FLOATING
FIT BETWEEN TOOL AND HOLDER
Filed Feb. 1, 1956  2 Sheets-Sheet 1
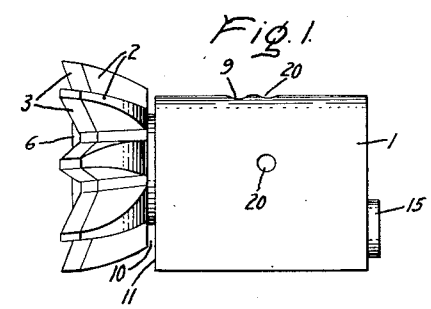
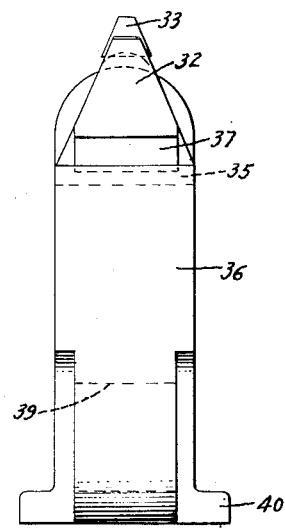
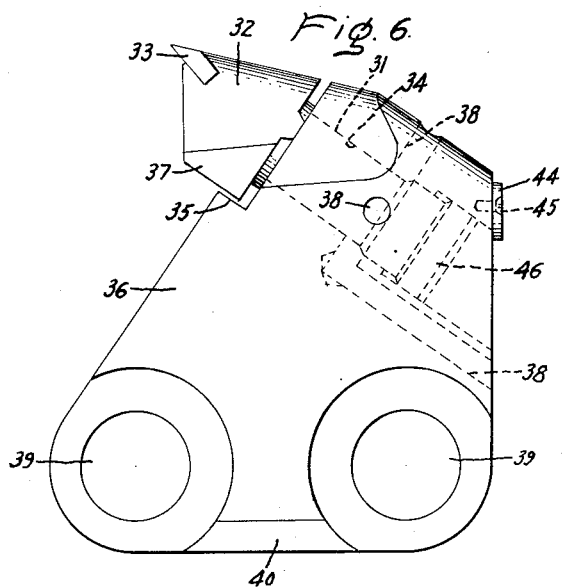
Inventor:
Floyd L. Kirkham,
by
His Attorney.

Oct. 22, 1957
F. L. KIRKHAM
2,810,567
CUTTER TOOL ASSEMBLY PROVIDING A FLOATING
FIT BETWEEN TOOL AND HOLDER
Filed Feb. 1, 1956
2 Sheets—Sheet 2
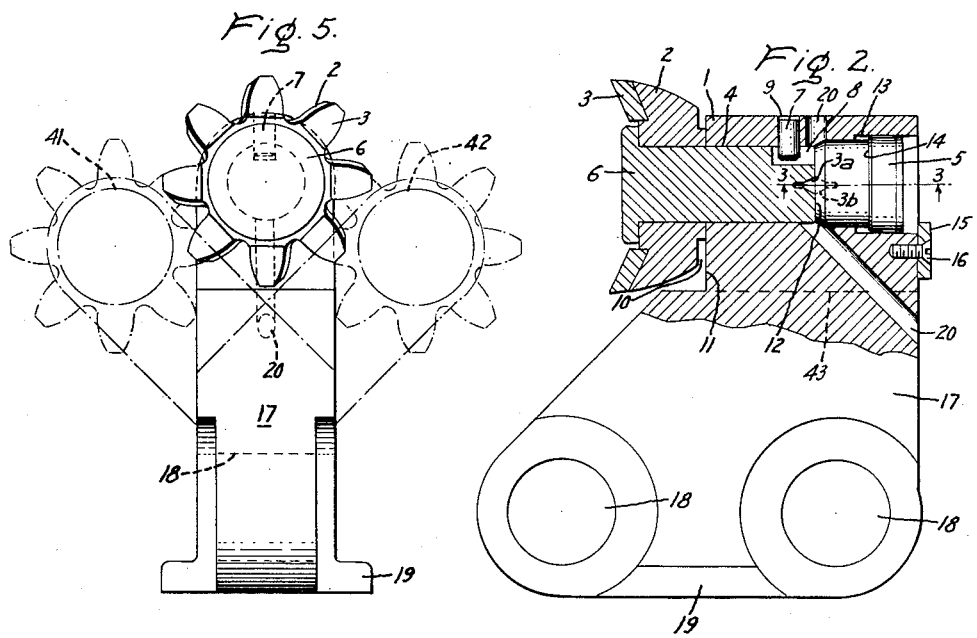
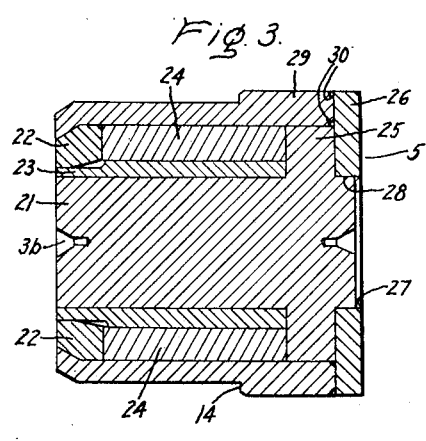
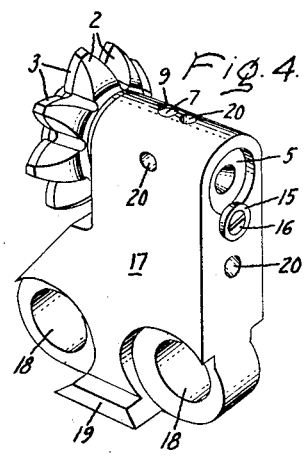
Inventor:
Floyd L. Kirkham,
by
His Attorney.

United States Patent Office 2,810,567
Patented Oct. 22, 1957

2,810,567

CUTTER TOOL ASSEMBLY PROVIDING A FLOATING FIT BETWEEN TOOL AND HOLDER

Floyd L. Kirkham, Detroit, Mich., assignor to General Electric Company, a corporation of New York Application February 1, 1956, Serial No. 562,737

7 Claims. (Cl. 262—33)

This invention relates to a cutter tool assembly designed greatly to facilitate removal and replacement of cutter bits by the utilization of magnetic means to maintain the cutter bit in place.

Cutter tool bits, although composed of very hard metals, are subject to inordinate demands in so far as their wear resistance and breakage are concerned. As a result, the repeated replacement of the cutter tool bits has become an accepted and unavoidable incidence of their use in industry.

These cutter tool bits are normally held in place by a screw or wedge or combination of both. In spite of many effors aimed at simplification of the means of attachment and removal, the changing of such cutter tool bits remains a very troublesome problem, particularly in view of the frequency with which the change must be carried out. These changes are very time-consuming, particularly where frozen screws, wedges or rings are encountered. It is not uncommon for industrial operations to become completely suspended pending the repair of cutter tool bit holding means. All of these difficulties, of course, result in a loss of man-hours and efficiency and a consequent increase in production costs.

An illustrative situation in which this problem arises is in the use of continuous coal mining machinery. In these operations the cutter bit changes must be made with a frequency and under conditions which render the problem extremely acute. In the usual case, the cutter bit is removed from the cutter bit holder by loosening the screw, wedge or other holding means and manually withdrawing the bit from its aperture. Large amounts of fine coal dust are normally produced in the coal mining operation and the dust works its way into the space, however small, between the bit shank and the aperture wall. This fine dust often becomes packed in this confined space and renders removal of the bit extremely difficult. In addition, where the cutter bit is held in place by a screw, the dust often manages to work its way into the threaded screw aperture, making loosening and tightening of the screw difficult and in some cases resulting in destruction of the threads of the screw or of the screw aperture.

It is therefore a primary object of this invention to obviate many of the difficulties mentioned above by providing a cutter tool bit holding means which markedly simplifies methods of removal and replacement of the cutter bit.

It is also an object of this invention to effect a considerable reduction in the time in which the cutter bit can be replaced in the cutter holder.

It is a further object of this invention to provide a novel cutter assembly which substantially eliminates difficulties encountered from the accumulation and packing of fine dust in the crevices of the holding device.

It is another object of this invention to provide a cutter assembly in which the cutter bit is firmly held during cutting operations, is easily removed for replacement and which can be removed and replaced in spaces which, with ordinary screw or wedge holding means, would be so confined that wrench or tool movement would be seriously curtailed or restricted.

Other objects and advantages of this invention will appear from the description which follows.

Briefly stated, the above objects are achieved by the provision of a permanent magnet in the holding means for the cutter bit. The cutter tool assembly is constructed so that movement of the cutter bit and magnetic means is restricted but not prevented in the cutter tool holder. This provides for a floating fit of the cutter bit and magnetic means in the cutter tool holder, the advantages of which will be apparent from the detailed description which follows. The magnet has both poles at one end and the magnetic flux is guided so as to achieve maximum holding power. Preferably, the cutting tool assembly is provided with appropriately situated, radially extending holes to provide for free movement of dust or dirt particles. The cutter bit is easily and rapidly removed by breaking contact with the permanent magnet, a step conveniently accomplished by means of a prying action, and is replaced by simply dropping the new bit in position in the cutter bit shank aperture.

My invention will be more clearly understood from the following description taken in connection with the accompanying drawings, in which Fig. 1 is a side elevation of a cutter tool assembly suitable for use in the mining of coal and constructed in accordance with one embodiment of my invention.

Fig. 2 is a side elevation, partly in section, of the cutter tool assembly of Fig. 1 mounted on a base suitable for attachment to a continuous coal mining machine.

Fig. 3 is a detailed sectional view taken on line 3—3 of Fig. 2 of the permanent magnet shown in smaller scale in Fig. 2.

Fig. 4 is a perspective view of the assembly of Fig. 2.

Fig. 5 is a front elevation of the cutter tool assembly and base of Fig. 2 showing in phantom outline the mounting of cutter tool assemblies at various angles from the vertical.

Fig. 6 is a side elevation of a modification of the cutter tool assembly and base of Fig. 2 and showing, in broken lines, internal features of construction of the cutter tool assembly.

Fig. 7 is a front elevation of the cutter tool assembly and base of Fig. 6.

Referring to the drawing, it will be seen that Figs. 1 and 2 show a cutter bit holder 1 in which is mounted a cutter tool bit 2 of the rotary type provided with cemented carbide cutting tips 3 suitable for use in the mining of coal. The cutter bit 2 is locked in position in the aperture 4 of cutter bit holder 1 by means of permanent magnet 5, shank pin 6 and lock pin 7.

To mount the cutter bit in operating position, shank pin 6, upon which cutter bit 2 is journaled for free rotation, is inserted horizontally into aperture 4, after which the permanent magnet 5 securely holds the cutter bit and shank in position.

It is desirable to prevent rotation of shank pin 6 in aperture 4 in order to prevent wear in aperture 4 and in order to avoid a diminishing of power of the permanent magnet 5. As a means of achieving this purpose, shank pin 6 is provided with slot 8, and bit holder 1 with hole 9, for the insertion of lock pin 7 which restrains rotation of shank pin 6. This in turn assures rotation of cutter bit 2 on shank pin 6 rather than rotation of shank pin 6 in aperture 4 of bit holder 1. Obviously, the lock pin 7 may be replaced with set screws or other equivalent restraining means. Also, a flat surface may be provided on the shank pin 6 in place of the slot 8 shown. In such case a horizontally positioned lock pin may be used.

Open space 10 is provided between cutter bit 2 and face 11 of cutter bit holder 1 in order to provide for the easy removal of cutter bit 2 by applying a wedging action. It has been found that when the magnetic contact at line 12 is broken approximately ⅛ inch, varying somewhat with the power of the permanent magnet, the cutter bit 2 and shank pin 6 may be easily and rapidly removed. This same procedure will, of course, be followed whether the shank pin is separate as in Fig. 2 or integral with the cutter bit as is shown in the modification of Figs. 6 and 7. The contact end of shank pin 6 in Fig. 2 is centered or countersunk at 3a so as to guide the magnetic flux, thereby providing maximum attracting force. It should be noted that lock pin 7 need not be removed when changing cutter bits. Slot 8, while preventing rotation of shank pin 6 does not prevent axial displacement of the shank pin forward.

The permanent magnet 5 is located in aperture 4 contacting shank pin 6 at line 12. The rear portion of magnet 5 is axially spaced a short distance forward from the back surface of bit holder 1. The diameter of aperture 4 is enlarged at 13 in order to form a shoulder which engages a corresponding shoulder 14 of permanent magnet 5. These shoulders prevent the cutter bit 2, shank pin 6 and magnet 5 from falling out when the cutter is not in operation, yet provide limited forward axial displacement. To permit limited axial displacement to the rear, the opening at the rear of aperture 4 is constricted by washer 15 projecting a slight distance above the lower surface of said opening and held in place by screw 16. In the alternative, a small nick or peened spot (not shown) on the inner edge of aperture 4 may serve to restrict movement of the magnet to the rear. From the above, it can be seen that means are provided for restricting but not preventing axial movement of the shank pin 6 and magnet 5, thereby providing for a floating fit of the shank pin and magnet.

This unique arrangement of magnet and shank pin has several advantages. In operation, particularly under conditions of severe stress, the shank pin, if both shank pin and magnet were held firmly, would vibrate while the magnet would either not vibrate at all or vibrate to a lesser extent. This, of course, would weaken or break contact between the shank pin and magnet. With the floating arrangement of this invention, any stress would result in vibration of the shank pin and magnet in unison, thereby avoiding this difficulty. In addition, the problem with coal dust or other dirt particles is primarily one of accumulation and packing. It is therefore advantageous to maintain these dust particles in movement or at least to avoid rigid and inflexible centers of accumulation. The floating movement, described above, tends to keep the dust moving, thereby tending to prevent accumulation and packing. Furthermore, the shank pin itself must generally conform in length to the construction of the tool bit holder. If the shank pin is as little as .005 of an inch too short in axial length, this would create a corresponding gap of .005 inch between magnet and shank. A gap of even such extremely small dimensions would result in a very considerable decreased holding power. Such close tolerances are avoided in both magnet and shank length by the flexibility afforded by the floating fit described above.

The construction of the cutter bit holder may be varied in accordance with the required needs of the situation. The embodiment illustrated in Fig. 1 is adapted for use in a continuous coal mining machine wherein the cutter tool assembly of Fig. 1 is mounted on base 17, as in Fig. 2 and a plurality of the illustrated cutter tool assemblies and bases are mounted in a series of parallel rows and in tandem on an endless chain link conveyor or on cutter holder arms. To mount the cutter holder and base on a continuous coal mining machine, conveyor chain links are simply inserted in link pin holes 18 and suitably fastened with conventional chain link fastening means. Lip 19, projecting from the bottom surface of cutter base 17, serves to guide and retain the cutter base in a suitable channel as the cutter tool revolves with a conveyor. Broken line 43 in Fig. 2 indicates the line of attachment of the cutter tool assembly of Fig. 1 on base 17. This attachment may be by welding or by other conventional means.

Fig. 5 illustrates in phantom other angles at which the cutter tool assembly may be mounted on the cutter tool base. When mounted on a continuous coal mining machine, the cutter tools are in tandem relationship and generally positioned at various angles from the vertical so that each tool cuts an adjacent portion of the kerf. The cutter tool assemblies may be mounted at any angle through an entire 180° arc. Fig. 5 illustrates in phantom at 41 and 42, in addition to the vertical assembly, two cutter assemblies angled in both directions from the vertical.

The elimination of conventional mechanical holding means in accordance with the teachings of this invention circumvents many of the difficulties encountered as a result of dust accumulation. However, in order to further insure the absence of such difficulties, the bit holder may be provided with a number of openings designed to allow free movement of any dust particles or other matter that tends to accumulate and compact in the interstices of the cutter assembly. These openings will prevent the build-up of excessive pressures which otherwise might result from the accumulation of such dust particles. Four of such openings are shown in Figs. 1, 2 and 4. Three holes 20 are provided through the top and sides of the bit holder 1 into aperture 4 to a point near the contact of shank pin 6 and magnet 5. A fourth hole 20 terminating on the opposite side of the preceding point of contact of shank pin 5 and magnet 6 and starting on the back surface of bit holder 1 may likewise be provided. This particular arrangement of holes is advantageous when the entire bit holder is rotated through a 360° angle in the course of its travel, as in the operation of a continuous coal mining machine, for which the embodiment here described is particularly adapted. The outlet holes may conveniently be used, when necessary, to clean out the accumulation of fine dust from aperture 4.

Referring more particularly to Fig. 3, it will be seen that magnet 5 comprises a first pole 21, preferably of soft steel, located in the core portion of the magnet and facing toward the line of contact 12 of the cutter shank 6 and magnet 5. To facilitate manufacturing and in order to guide the magnetic flux, pole 21 is centered at 3b. A second pole 22, also preferably of soft steel, concentric with the first pole, is radially spaced from the first pole by means of non-conducting annular spacer 23. Spacer 23 shields the jump of magnetic flux across the poles and prevents entrance of metallic dirt or dust. Spacer 23 has an L-shaped reduction in cross-sectional area at the pole or front end in order to accommodate pole 22. Pole 22 is angled on the inner side and chamfered on the outer side in order to guide the magnetic flux. Both poles 21 and 22 face in the same direction. Permanent magnet material 24 is located directly behind pole 22 and is concentric with pole 21.

The permanent magnet material 24 is of the highest available external energy, an illustrative material being a permanent magnet material of the type known to the trade as Alnico V. The permanent magnet material 24 is of sufficient depth so as to contact the front surface of flange 25.

At the rearmost portion of magnet 5 is a brass washer 26, brazed to pole 21, the braze being shown at 27. The washer 26 fits over shoulder 28 at the rear of pole 21. Brass shielding 29 is brazed to the assembled washer 26 and pole 21, the braze being shown by shaded areas 30. The shielding 29 contacts pole 21 at flange 25.

This particular arrangement of the components of permanent magnet 5 having both poles at one end, provides for maximum holding power and yet presents a minimum of dust accumulation surface.

Figs. 6 and 7 show a modification of the assembly shown in Figs. 1–5 wherein shank pin 31 and cutter bit 32 are integral. In this modification, the cutter assembly is angled from the horizontal and the single cutter tip 33 is at the uppermost point on the cutter assembly. No lock pins or slots are necessary to prevent rotation of shank pin 31 in aperture 34, since shoulder 35 in base 36 abuts bottom surface 37 of cutter bit 32, thereby preventing rotation of the shank pin 31 or cutter bit 32. Holes 38 are also provided as in the modification shown in Figs. 1–5, for the removal and prevention of dust accumulation. Link pin holes 39 and lip 40 correspond to those illustrated in the modification of Figs. 1–5. Washer 44 and screw 45 permit limited axial displacement to the rear and at the same time prevent cutter bit 32, shank pin 31 and magnet 46 from falling out when the cutter is not in operation.

In the mining of coal, either the modification of Fig. 1 or Fig. 6 may be used. However, it will be found advantageous to use the rotary type cutter of Fig. 1 because fewer cutter tools will be necessary. As can be seen in Fig. 5, the teeth of the cutter bit are angled slightly from the horizontal as viewed from the front of the cutter bit to the rear. This helical arrangement will result in a rotating movement of the bit as it cuts into the kerf of coal. This in turn will minimize overheating as some cutter bits are always in a non-cutting position. In addition, a wider swath or path in the kerf will be made than with a single cutter tool.

In an actual test, a steel bar 8 inches in diameter with a longitudinal milled slot 2 inches wide and 1½ inches deep was turned on a lathe using a cutting tool assembly according to the teachings of this invention. The milled slot subjected the cutting tool to severe stresses and vibration as the bar rotated in the lathe and the cutting tool contacted the slot. The cutting tool bit held perfect at all times and no chatter was noticeable, though various speeds, feeds and depth of cuts were used. A change of the cutter bit became necessary at one time during the cutting operation. The cutter bit was manually removed and replaced while the procedure was timed. The total shutdown time for lathe operation was six seconds. Additional tests were recorded and lathe down-time for tool bit changes ranged from 5 to 9 seconds.

From the above, it can be seen that a novel cutter tool has been provided in which a permanent magnet is utilized to securely hold a cutter bit. The cutter bit can be easily and rapidly removed by hand, even though coal dust or other material has accumulated, by a prying or wedging action between a portion of the cutter bit and the cutter bit holder face to break contact between the cutter bit shank and the permanent magnet. The new cutter bit is then replaced by simple manual insertion. In spite of the ease of replacement, the cutter bit is securely held at all times during operation.

It will be obvious to one skilled in the art that many modifications of the above described cutter tool assembly may be made without departing from the spirit and scope of this invention. For example, the particular relationship between the permanent magnet and the cutter tool bit or bit shank may take various forms. Likewise, the particular shape of the shank may be varied. For example, the shank may be square or polygonal in cross-sectional shape rather than circular. Also, it will be obvious that while multiple cutter tips have been used in the embodiment shown in Figs. 1–5 a single cutter tip may be employed; and while the embodiment shown in Figs. 6 and 7 employs a single cutter tip, multiple cutter tips may be used, if desired.

What I claim as new and desire to secure by Letters Patent of the United States is:

1. A cutter tool assembly comprising a cutter tool bit, a cutter tool holder containing an aperture, mounting means for mounting the cutter tool bit in the cutter tool holder, said mounting means including a shank for insertion in the aperture of the cutter tool holder, magnetic means having both poles at one end and positioned so as to contact a terminal portion of the shank, means for restricting but not preventing axial movement of the cutter bit, mounting means and magnetic means in the cutter tool holder, thereby providing for a floating fit of the cutter bit, mounting means and magnetic means in the cutter tool holder.

2. A cutter tool assembly comprising a cutter tool bit, a cutter tool holder containing an aperture, mounting means for mounting the cutter tool bit in the cutter tool holder, said mounting means including a shank for insertion in the aperture of the cutter tool holder, magnetic means having both poles at one end and positioned so as to contact a terminal portion of the shank, means for restricting but not preventing axial movement of the cutter bit, mounting means and magnetic means in the cutter tool holder, said restricting means comprising shoulders in the aperture and magnetic means respectively to restrict axial movement in a first direction and a constriction in the aperture exit to restrict movement in a second axial direction, thereby providing for a floating fit of the cutter bit, mounting means and magnetic means in the cutter tool holder.

3. A cutter tool assembly comprising a cutter tool bit having a plurality of radially spaced cutter tips, a cutter tool holder containing an aperture, mounting means for mounting the cutter tool bit in the cutter tool holder, said mounting means including a shank having a first terminal portion for mounting the cutter tool bit and a second terminal portion for insertion in the aperture of the cutter tool holder, said cutter tool bit being journalled on the first terminal portion of the shank for free rotation thereon, said shank including means for prevention of its rotation in the cutter tool aperture, magnetic means having both poles at one end and positioned so as to contact the second terminal portion of the shank, means for restricting but not preventing axial movement of the cutter bit, mounting means and magnetic means in the cutter tool holder, thereby providing for a floating fit of the cutter bit, mounting means and magnetic means in the cutter tool holder.

4. A cutter tool assembly comprising a cutter tool bit having a single cutter tip, a shank integral with the cutter tool bit for mounting said cutter tool bit, a cutter tool holder having an aperture to receive the mounting means for the cutter tool bit, magnetic means having both poles at one end and positioned so as to contact a terminal portion of the shank, means for restricting but not preventing axial movement of the cutter bit, mounting means and magnetic means in the cutter tool holder, thereby providing for a floating fit of the cutter bit, mounting means and magnetic means in the cutter tool holder.

5. A cutter tool assembly comprising a cutter tool bit, a cutter tool holder containing a substantially horizontally disposed aperture, mounting means for mounting the cutter tool bit in the cutter tool holder, said mounting means including a shank for insertion in the aperture of the cutter tool holder, a permanent magnet disposed horizontally in the aperture of the cutter tool holder, said shank and magnet being centered and the outer pole of said magnet being chamfered so as to achieve maximum holding power, said magnet being positioned so as to securely retain the shank and cutter bit in the cutter tool holder, means for restricting but not preventing axial movement of the cutter bit, mounting means and magnetic means in the cutter tool holder, thereby providing for a floating fit of the cutter bit, mounting means and magnetic means in the cutter tool holder.

6. A cutter tool assembly comprising a cutter tool bit, a cutter tool holder containing an aperture and holes extending radially from the aperture through the cutter tool holder, mounting means for mounting the cutter tool bit in the cutter tool holder, said mounting means including a shank for insertion in the aperture of the cutter tool holder, magnetic means having both holes at one end and positioned so as to contact a terminal portion of the shank, means for restricting but not preventing axial movement of the cutter bit, mounting means and magnetic means in the cutter tool holder, thereby providing for a floating fit of the cutter bit, mounting means and magnetic means in the cutter tool holder.

7. A cutter tool assembly comprising a cutter tool bit, a cutter tool holder containing an aperture, mounting means for mounting the cutter tool bit in the cutter tool holder, said mounting means including a shank for insertion in the aperture of the cutter tool holder, a permanent magnet having both poles at one end and positioned so as to contact a terminal portion of the shank, said permanent magnet comprising a first pole located in the core portion of the magnet and facing toward the line of contact of the shank and magnet, a second pole concentric with the first pole and radially spaced from the first pole by means of a non-conducting annular spacer, permanent magnetic material located directly behind said second pole and concentric with said first pole and a non-conducting shielding surrounding said permanent magnet and said second pole and concentric with said first pole, means for restricting but not preventing axial movement of the cutter bit, mounting means and magnetic means in the cutter tool holder, thereby providing for a floating fit of the cutter bit, mounting means and magnetic means in the cutter tool holder.

References Cited in the file of this patent

UNITED STATES PATENTS

| | | |
|---|---|---|
| 532,511 | Wiggs | Jan. 15, 1895 |
| 2,510,634 | Hull | June 6, 1950 |
| 2,510,648 | Moholy-Nagy | June 6, 1950 |
| 2,657,916 | Von Stroh | Nov. 3, 1953 |
| 2,683,931 | Fahlgren | July 20, 1954 |

FOREIGN PATENTS

| | | |
|---|---|---|
| 5,278 | Great Britain | of 1896 |